United States Patent
Kataoka et al.

(10) Patent No.: US 6,784,402 B2
(45) Date of Patent: Aug. 31, 2004

(54) STEEL WIRE FOR MAG WELDING AND MAG WELDING METHOD USING THE SAME

(75) Inventors: Tokihiko Kataoka, Okayama (JP); Shuichi Sakaguchi, Chiba (JP); Koichi Yasuda, Chiba (JP)

(73) Assignee: JFE Steel Corporation (JP)

(*) Notice: Subject to any disclaimer, the term of this patent is extended or adjusted under 35 U.S.C. 154(b) by 0 days.

(21) Appl. No.: 10/107,623

(22) Filed: Mar. 27, 2002

(65) Prior Publication Data

US 2003/0189034 A1 Oct. 9, 2003

(51) Int. Cl.⁷ ............................................. B23K 35/22
(52) U.S. Cl. ............................. 219/146.1; 219/146.24
(58) Field of Search .................. 219/146.1, 146.24, 219/146.51, 145.1

(56) References Cited

U.S. PATENT DOCUMENTS

| | | | | |
|---|---|---|---|---|
| 1,972,463 A | * | 9/1934 | Schlecht et al. | ............... 219/8 |
| 2,694,764 A | * | 11/1954 | Muller | ......................... 219/10 |
| 2,900,490 A | * | 8/1959 | Petryck et al. | ............... 219/137 |
| 3,215,814 A | * | 11/1965 | Dorschu | ...................... 219/145 |
| 3,404,249 A | * | 10/1968 | Dorschu | ....................... 219/74 |
| 3,438,755 A | * | 4/1969 | Millhoff | .................... 29/183.5 |
| 3,483,354 A | * | 12/1969 | Manz et al. | ................. 219/137 |
| 3,627,574 A | * | 12/1971 | Delong et al. | ............... 117/205 |
| 4,175,227 A | | 11/1979 | Kasper | |
| 4,313,045 A | | 1/1982 | Agusa et al. | |
| 4,843,212 A | | 6/1989 | Shneerov et al. | |
| 5,744,782 A | * | 4/1998 | Sampath et al. | ......... 219/146.1 |
| 6,207,927 B1 | | 3/2001 | Mita et al. | |

FOREIGN PATENT DOCUMENTS

| | | | | |
|---|---|---|---|---|
| DE | 1 259 683 | 1/1968 | | |
| FR | 2 264 624 | 10/1975 | | |
| GB | 970866 | 9/1964 | | |
| JP | 60 096394 | 5/1985 | | |
| JP | 10 216972 | 8/1998 | | |
| JP | 333586 | * 11/1998 | ........... B23K/35/30 | |
| JP | 11 028594 | 2/1999 | | |
| JP | 148663 | * 5/2000 | ............ B23K/9/16 | |

* cited by examiner

Primary Examiner—M. Alexandra Elve
(74) Attorney, Agent, or Firm—Piper Rudnick LLP

(57) ABSTRACT

A steel wire for MAG welding in DC-electrode negative contains about 0.20% by mass or less of C, about 0.25% to about 2.5% by mass of Si, about 0.45% to about 3.5% by mass of Mn, about 0.005% to about 0.040% by mass of rare-earth elements, about 0.05% by mass or less of P, about 0.05% by mass or less of S, and the balance being Fe and incidental impurities. A method for MAG welding in DC-electrode negative for welding steel sheets having a thickness of about 0.2 to about 4.5 mm using the steel wire is also disclosed.

13 Claims, 2 Drawing Sheets

STEEL WIRE FOR MAG WELDING AND MAG WELDING METHOD USING THE SAME

BACKGROUND OF THE INVENTION

1. Field of the Invention

This invention relates to steel wire for Metal Active Gas (MAG) welding in DC-electrode negative (hereinafter referred to as "DC-EN"), and to welding methods using the same. More particularly, the invention relates to steel wire for MAG welding in DC-EN which is used when the wire is connected to the negative terminal of a welding machine and steel sheets with a thickness of 0.2 to 4.5 mm are welded in one pass, and to a method for MAG welding in DC-EN using the steel wire.

2. Description of the Related Art

MAG welding uses a shielding gas containing a mixture of Ar gas and $CO_2$ gas (5% by volume or more) or a mixture of Ar gas and $O_2$ gas (1% to 10% by volume). It is a most commonly used welding method, is highly efficient, and it is widely used for the welding of steel materials. In particular, since automatic welding has come into widespread use rapidly, MAG welding has been widely used in the fields of shipbuilding, construction, bridges, automobiles, building machinery, etc. In the fields of shipbuilding, construction, and bridges, MAG welding is primarily used when thick steel sheets are subjected to high-current multi-pass welding. In the fields of automobiles and building machinery, MAG welding is often used when thin steel sheets are subjected to fillet welding.

In the fields of automobiles and building machinery, thin high-strength steel sheets have been increasingly used to reduce weight. However, as the strength of steel sheets is increased, strain and camber easily occur, resulting in an increase in the gap at the joint between the steel sheets. As the thickness of steel sheets as workpieces is decreased, the ratio of the gap between the steel sheets at the joint to the thickness of the workpieces increases. This results in an increase in the defect rate due to burn through. Under the circumstances, a new welding method in which burn through does not easily occur in thin steel sheets and superior gap weldability is exhibited has been desired.

In the conventional MAG welding process, welding in DC-electrode positive (hereinafter referred to as "DC-EP"), a wire is used as a consumable electrode and is connected to the positive terminal of a welding machine. This has been widely used because the arc is stable both in the low current region and in the high current region. In the welding process in DC-EP, a large amount of heat is generated due to the collision of positive ions having larger kinetic energy than electrons with the steel sheet on the negative side, and the steel sheet is deeply penetrated. Therefore, welding in DC-EP is suitable for multi-pass welding of thick steel sheets. However, when the welding process in DC-EP is employed for fillet welding of thin steel sheets, since the thermal effect on the steel sheets is large and the penetration into the steel sheets is deep, weld defects easily occur due to burn through. When thin steel sheets are subjected to fillet welding, it is most important to avoid weld defects due to burn through and to improve welding speed. Therefore, use of welding in DC-EP in fillet welding of thin steel sheets is problematic.

On the other hand, Metal Inert Gas (MIG) welding, which is a welding process in DC-EP using inert gas, such as pure Ar, is employed when some special steels are welded. For example, it is used for welding of high tensile strength steels having a tensile strength of approximately 980 Mpa, which require high toughness by decreasing the amount of oxygen in the weld metal and the welding of stainless steels. A method has been disclosed in which REM is added to the welding wire to stabilize the arc from a welding wire in MIG welding (Journal of Japan Welding Society Vol. 50 (1981) No. 11 Page 1066–1074). The advantage of adding stabilizing REM to the welding wire is that it is possible to suppress the shift of the cathode spot due to cleaning action in MIG welding, i.e., the phenomenon in which the cathode spot (on the steel sheet side) crawls around the periphery of the weld metal in search of a more electron-releasing oxide, and that stable spray transfer is enabled. However, adding REM to the wire in the MAG welding process, which contains oxidizing gas and which is active, coarsens molten particles and increases the number of large spatters.

On the other hand, in welding in DC-EN in which a wire is connected to the negative terminal of a welding machine, a small amount of heat is generated due to the collision of electrons having less kinetic energy than positive ions with the steel sheet on the positive side, and penetration of the steel sheets is shallow, while the welding speed of the wire is high and the amount of weld deposition is large. Therefore, welding in DC-EN is suitable for welding of thin steel sheets and, in particular, suitable for welding when a large gap occurs between steel sheets at the joint. However, in the welding process in DC-EN, molten particles suspended from the tip of the wire are coarsened, resulting in the arc instability. Furthermore, in high-speed welding, humping of weld beads and irregular bead shape tend to occur. Consequently, practical use of welding in DC-EN has not been implemented.

With respect to welding in DC-EN, several proposals have been made in limited fields. For example, Japanese Unexamined Patent Publication Nos. 58-167078 and 5-138355 disclose consumable electrode-type gas shielded arc welding methods in which welding is performed by controlling the ratio between the period of welding in DC-EN and the period of welding in DC-EP because there are great differences in the depth of penetration and the welding speed between welding in DC-EN and welding in DC-EP. However, in such welding methods, the arc stability is insufficient, and compositions of wires are not taken into consideration.

As described above, the welding process in DC-EN is suitable for welding thin steel sheets because of the shallow penetration and the large amount of weld deposition and, in particular, is considered to be suitable for welding of a joint having a large gap. However, in the conventional steel wire for welding, since coarse molten particles unstably suspend from the tip of the wire, the arc becomes unstable and a large number of spatters are generated.

It would, therefore, be highly advantageous to provide steel wire for MAG welding in DC-EN, which is suitable for use in welding in DC-EN, which prevents burn-through defects in the welding of thin steel sheets, which has superior gap weldability and arc stability so that sound welding of a joint with a large gap can be performed and the number of spatters generated is decreased. It would also be advantageous to provide a method for MAG welding in DC-EN using the steel wire.

SUMMARY OF THE INVENTION

We carried out thorough research on the influence of the composition of wire on arc stability, gap weldability, and the bead shape in welding in DC-EN. We discovered that the arc can be stabilized and the gap weldability is ensured by combining the welding process in DC-EN, which usually makes the arc unstable in MAG welding, with the addition of REM to the wire.

We found the following:

1) By adding rare-earth elements (atomic Nos. 57 to 71, hereinafter, referred to as "REM"), and by primarily adding Ce, to the wire, arc stop in the low voltage region can be prevented, and regular short circuit transfer can be performed.
2) By setting the contents of Si, Mn, Ti, Zr, and Al, which are deoxidizing elements, to satisfy predetermined ranges and relationships, stable gap weldability can be obtained.

Accordingly, in one aspect, the invention includes a steel wire for MAG welding in DC-EN containing about 0.20% by mass or less of C, about 0.25% to about 2.5% by mass of Si, about 0.45% to about 3.5% by mass of Mn, about 0.005% to about 0.040% by mass of REM, about 0.05% by mass or less of P, about 0.05% by mass or less of S, and the balance being Fe and incidental impurities.

In the steel wire of the invention, preferably, the $D_1$ value in accordance with the following equation (1) is in the range of about 1.2 to about 2.1.

$$D_1=((Si)/2)+(Mn)/3) \tag{1}$$

(Si): Si content (% by mass)
(Mn): Mn content (% by mass)

Preferably, the steel wire of the invention further contains at least one of about 0.30% by mass or less of Ti, about 0.30% by mass or less of Zr, and about 0.50% by mass or less of Al.

Preferably, the steel wire of the invention further contains about 3.00% by mass or less of Cr.

More preferably, the $D_2$ value in accordance with the following equation (2) is in the range of about 1.2 to about 2.1.

$$D_2=((Si)/2)+((Mn)/3)+((Ti)+(Zr)+(Al)) \tag{2}$$

(Si): Si content (% by mass)
(Mn): Mn content (% by mass)
(Ti): Ti content (% by mass)
(Zr): Zr content (% by mass)
(Al): Al content (% by mass)

Preferably, the steel wire of the invention further contains about 0.0001% to about 0.0150% by mass of K.

Preferably, the steel wire of the invention includes a Cu-plating layer having an average thickness of about 0.5 μm or more as a surface layer.

In another aspect of the invention, a method for MAG welding in DC-EN for welding steel sheets having a thickness of about 0.2 to about 4.5 mm using any one of the steel wires for MAG welding in DC-EN described above, includes performing single pass welding, wherein the ratio of the gap between the steel sheets to the thickness of the steel sheets is about 1/2 or more.

DETAILED DESCRIPTION

Figure 1A:
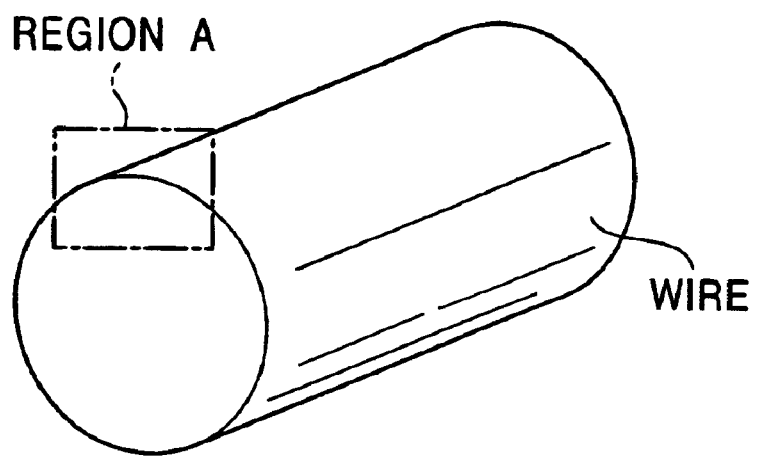
FIG. 1A is a schematic diagram showing a steel wire for MAG welding in DC-EN of the invention.

First, the reasons for setting the limits for the constituents of a steel wire for MAG welding in DC-EN will be described.

C: About 0.20% by Mass or Less

C, which is an important element to ensure the strength of the weld metal, improves the fluidity of the molten steel by decreasing the viscosity. Such effects are displayed when the C content is about 0.01% by mass or more. However, if the C content becomes excessively large, the behaviors of molten particles and the molten pool become unstable, resulting in a decrease in the toughness of the weld metal. Therefore, the C content must be set at about 0.20% by mass or less. Preferably, the C content is in the range of about 0.01% to about 0.10% by mass.

Si: About 0.25% to About 2.5% by Mass

Si has a deoxidizing effect and is an essential element for deoxidizing the weld metal. Moreover, Si suppresses the spreading of the arc during welding in DC-EN and increases the number of short circuit transfers. When a joint of thin steel sheets with a large gap is welded, Si inhibits burn through due to arc heat, thereby improving gap weldability. Such effects are displayed when the Si content is about 0.25% by mass or more. Preferably, the Si content is set at about 1.10% by mass or more to further improve the gap weldability and the bead shape. On the other hand, if the Si content exceeds about 2.5% by mass, the toughness of the weld metal decreases. Therefore, the Si content must be in the range of about 0.25% to about 2.5% by mass. Preferably, the Si content is in the range of about 1.10% to about 2.5% by mass.

Mn: About 0.45% to About 3.5% by Mass

Mn has a deoxidizing effect just like Si and is an essential element for deoxidizing the weld metal. Such an effect is displayed when the Mn content is about 0.45% by mass or more. If the Mn content is less than about 0.45% by mass, the weld metal is insufficiently deoxidized and blowholes occur in the weld metal. On the other hand, if the Mn content exceeds about 3.5% by mass, the toughness of the weld metal is degraded. Therefore, the Mn content must be in the range of about 0.45% to about 3.5% by mass.

REM: About 0.005% to About 0.040% by Mass

REM is added to the steel to refine inclusions and improve toughness in the steel making and casting processes. In the MAG welding process in DC-EN, REM prevents the arc stop at low voltages and also stabilizes the short circuit transfer of molten particles. Such effects are not displayed if the REM content is less than about 0.005% by mass. If the REM content exceeds about 0.040% by mass, the arc becomes unstable, and the welding speed of the steel wire for MAG welding in DC-EN likely decreases and burn through is likely to occur. Therefore, the REM content must be in the range of about 0.005% to about 0.040% by mass. Preferably, the REM content is in the range of about 0.010% to about 0.040% by mass.

P: About 0.050% by Mass or Less

P decreases the melting point of steel and increases the electrical resistance of steel, thereby improving welding efficiency. P also stabilizes the arc in the MAG welding process in DC-EN. Such effects are displayed remarkably when the P content is about 0.003% by mass or more. However, if the P content exceeds about 0.050% by mass, the viscosity of the weld metal is decreased, the arc becomes unstable, and the number of small spatters is increased. Therefore, the P content is set at about 0.050% by mass or less. Preferably, the P content is in the range of about 0.003% to about 0.050% by mass.

S: About 0.050% by Mass or Less

S decreases the viscosity of the molten metal and smoothly releases molten particles suspended from the tip of the wire and, thus, the bead is smoothened and burn through of the thin steel sheet can be inhibited. In the MAG welding process in DC-EN, S also stabilizes the arc. However, the number of small spatters increases and the toughness of the weld metal decreases if the S content exceeds about 0.050% my mass. Therefore, the S content is set at about 0.050% by mass or less. Additionally, the arc-stabilizing effect is remarkably displayed when the S content is about 0.015% by mass or more, and a decrease in the toughness of the weld metal is remarkably prevented when the S content is about 0.030% by mass or less. Therefore, preferably, the S content is in the range of about 0.015% to about 0.030% by mass.

$D_1$ Value: About 1.2 to About 2.1

The $D_1$ value is calculated by the following equation (1).

$$D_1=((Si)/2)+((Mn)/3) \tag{1}$$

(Si): Si content (% by mass)
(Mn): Mn content (% by mass)

Although the addition of Si and Mn to the steel wire is effective as described above, if the $D_1$ value is less than about 1.2, the oxygen level in the molten particles is increased and the effect of REM is not sufficiently displayed and the arc becomes unstable. Thereby, convex and irregular beads are produced, and welding defects occur due to shifting of the position of the wire. On the other hand, if the $D_1$ value exceeds about 2.1, since the deoxidizing effect becomes excessive and the oxygen level in the molten particles is decreased, the viscosity of the molten particles is increased and the arc becomes unstable, thereby resulting in an increase in the generation of large spatters. Therefore, preferably, the $D_1$ value is in the range of about 1.2 to about 2.1.

At least one of Ti, Zr, and Al may be added to the steel wire as needed. In such a case, the contents of the individual elements will be set as described below.

Ti: About 0.30% by Mass or Less

Ti is an element which has a deoxidizing effect and increases the strength of the weld metal. Such effects are remarkably displayed when the Ti content is about 0.01% by mass or more. However, if the Ti content exceeds about 0.30% by mass, molten particles are coarsened and large spatters are generated. Therefore, preferably, the Ti content is about 0.30% by mass or less. More preferably, the Ti content is in the range of about 0.01% to about 0.30% by mass. Most preferably, the Ti content is in the range of about 0.05% to about 0.25% by mass. Additionally, the incidental impurity level in Ti is about 0.002% by mass or less.

Zr: About 0.30% by Mass or Less

Zr is an element which has a deoxidizing effect, improves the strength and toughness of the weld metal, and improves the arc stability. Such effects are remarkably displayed when the Zr content is about 0.02% by mass or more. However, toughness is degraded if the Zr content exceeds about 0.30% by mass. Therefore, the Zr content is preferably about 0.30% by mass or less. Additionally, the incidental impurity level in Zr is about 0.001% by mass or less.

Al: About 0.50% by Mass or Less

Al is an element which has a deoxidizing effect, improves the strength and toughness of the weld metal, and improves the arc stability. Such effects are remarkably displayed when the Al content is about 0.015% by mass or more. However, toughness is degraded if the Al content exceeds about 0.50% by mass. Therefore, the Al content is preferably about 0.50% by mass or less. Additionally, the incidental impurity level in Al is about 0.003% by mass or less.

$D_2$ Value: About 1.2 to About 2.1

The $D_2$ value is calculated by the following equation (2).

$$D_2=((Si)/2)+((Mn)/3)+((Ti)+(Zr)+(Al)) \tag{2}$$

(Si): Si content (% by mass)
(Mn): Mn content (% by mass)
(Ti): Ti content (% by mass)
(Zr): Zr content (% by mass)
(Al): Al content (% by mass)

Although adding Si, Mn, Ti, Zr, and Al to the steel wire is effective as described above, if the $D_2$ value is less than about 1.2, the oxygen level in the molten particles is increased and the effect of REM is not sufficiently displayed and the arc becomes unstable. Thereby, convex and irregular beads are produced, and welding defects occur due to shifting of the position of the wire. On the other hand, if the $D_2$ value exceeds about 2.1, since the deoxidizing effect becomes excessive and the oxygen level in the molten particles is decreased, the viscosity of the molten particles increases and the arc becomes unstable, thereby resulting in an increase in the generation of large spatters. Therefore, preferably, the $D_2$ value is in the range of about 1.2 to about 2.1.

However, as described above, at least one of Ti, Zr, and Al may be contained in the steel wire as needed. With respect to these elements not contained in the steel wire and incidental impurities, the content is considered to be zero for the calculation of the $D_2$ value. Therefore, when Ti, Zr, and Al are not contained in the steel wire, (Ti)+(Zr)+(Al)=0, and hence $D_2=D_1$.

Cr: About 3.00% by Mass or Less

Cr, which has a smaller deoxidizing effect than Si, Mn, Ti, Zr, and Al, increases the strength of the weld metal and improves atmospheric corrosion resistance. However, if the Cr content is excessive, toughness is decreased. Therefore, the Cr content is preferably about 3.00% by mass or less. More preferably, the Cr content is in the range of about 0.15% to about 0.70% by mass.

K: About 0.0001% to About 0.0150% by Mass

K spreads and softens the arc, and in MAG welding in DC-EN, K refines molten particles and transfers the particles smoothly. Such effects are displayed when the K content is about 0.0001% by mass or more. On the other hand, if the K content exceeds about 0.0150% by mass, the molten particles suspended from the tip of the wire become unstable since the arc is lengthened, thereby resulting in an increase in the generation of spatters. Therefore, preferably, the K content is in the range of about 0.0001% to about 0.0150% by mass. More preferably, the K content is in the range of about 0.0003% to about 0.0030% by mass. Since K has a low boiling point of about 760° C. and the yield is significantly low in the steel-making stage for the raw material steel, preferably, instead of adding K in the steel-making stage, a potassium salt solution is applied on the surface of the wire in the wire-making stage and then annealing is performed so that K is stably contained in the wire.

Additionally, Ca, Ni, Mo, Cu, B, Nb, and V stabilize the arc, increase the strength of the weld metal, and improve the atmospheric corrosion resistance. Hence, they may be selectively contained in the steel wire as needed. The reasons for setting the limits for the individual elements will be descried below.

Ca: About 0.0050% by Mass or Less

Ca is contained in the steel as an impurity during steel-making and casting or is contained in the steel wire as an impurity during wire drawing. In the welding process in DC-EN, Ca tends to stabilize the arc. Such an effect is remarkably displayed when the Ca content is about 0.0003% by mass or more. However, if the Ca content exceeds about 0.0050% by mass, the arc becomes unstable because the arc is concentrated on molten particles, resulting in an increase in spattering. Therefore, preferably, the Ca content is about 0.0050% by mass or less.

Ni: About 3.0% by Mass or Less, Mo: About 1.5% by Mass or Less, Cu: About 3.0% by Mass or Less, and B: About 0.010% by Mass or Less Each of Ni, Mo, Cu, and B increases the strength of the weld metal and improves the atmospheric corrosion resistance, and may be selectively contained in the steel wire as needed. Such effects are remarkably displayed when the content of each of Ni, Mo, Cu, and B is about 0.10% by mass or more. However, toughness is decreased if the content becomes excessive. Therefore, when they are contained in the wire, preferably, the Ni content is about 3.0% by mass or less, the Mo content is about 1.50% by mass or less, the Cu content is about 3.00% by mass or less, and the B content is about 0.010% by mass or less.

Nb and V: About 0.55% by Mass or Less in Total

Each of Nb and V improves the strength and toughness of the weld metal and the stability of the arc, and at least one of Nb and V may be selectively contained in the steel wire as needed. Such effects are remarkably displayed when the content of each of Nb and V is about 0.01% by mass or more. However, if the total content of these elements exceeds about 0.55% by mass, toughness is decreased. Therefore, preferably, the total content of at least one of Nb and V is set at about 0.55% by mass or less.

The balance other than the constituents described above is Fe and incidental impurities. As the incidental impurities, about 0.020% by mass or less of O and about 0.010% by mass or less of N are permissible. Additionally, O is incidentally added to the steel in the steel-making stage or to the steel wire in the wire-making stage, and is effective in refining the transfer pattern of molten particles. Preferably, the O content is adjusted in the range of about 0.0020% by mass to about 0.0080% by mass, and more preferably, in the range of about 0.0020% by mass to less than about 0.0080% by mass.

Next, a method for MAG welding in DC-EN for welding steel sheets using the steel wire for MAG welding in DC-EN of the invention will be described.

It is possible to weld the steel sheets with a thickness of about 1.2 mm or less, by welding steel sheets using the steel wire for MAG welding in DC-EP of the invention, which is difficult to perform in the usual welding process in DC-EP. However, if the thickness of the steel sheets is less than about 0.2 mm, welding defects occur due to burn through of the weld. On the other hand, the welding speed must be descreased if the thickness exceeds about 4.5 mm. Therefore, the thickness of the steel sheets to be welded by the welding method of the invention is in the range of about 0.2 to about 4.5 mm.

Figure 2A:
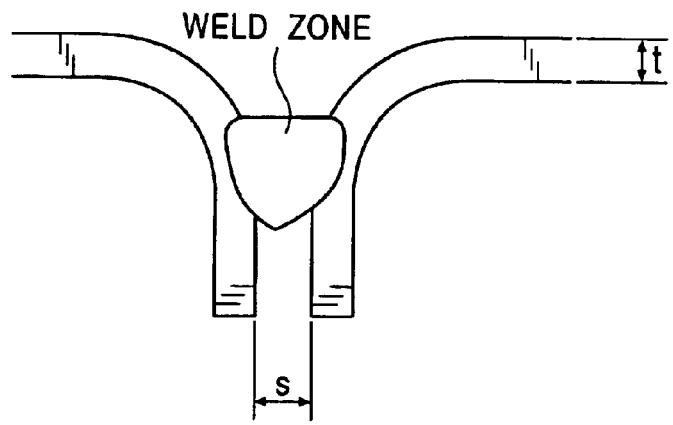
FIG. 2A is a sectional view showing a flare joint of the invention.
Figure 2B:
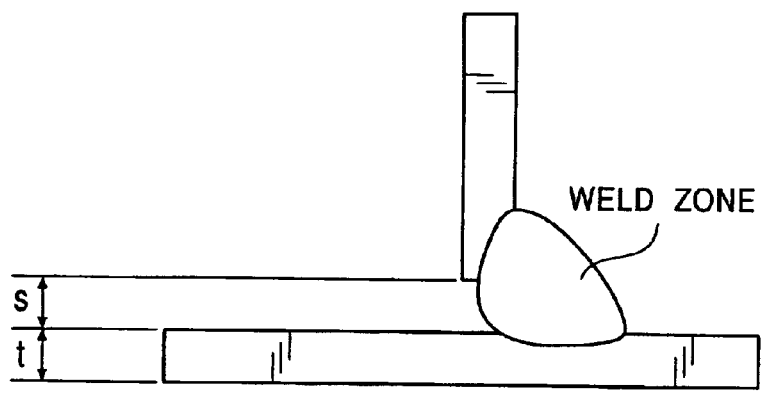
FIG. 2B is a sectional view showing a T joint of the invention.
Figure 2C:
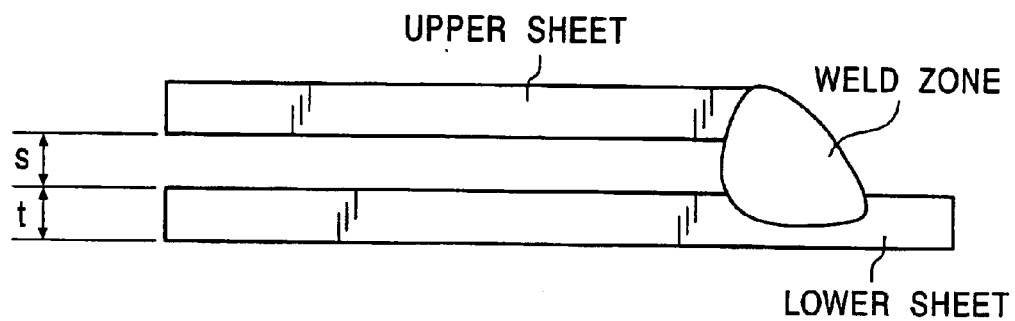
FIG. 2C is a sectional view showing a lap joint of the invention.

The gap S between steel sheets at the joint, to which the welding method of the invention is typically applied, may be one half of the thickness t or more, that is, welding which satisfies the relationship $S \geq 0.5$ t can be performed. This is difficult in the usual welding process in DC-EP. For example, when the flare joint, the T joint and the lap joint as shown in FIGS. 2A, 2B and 2C are welded, it is possible to perform sound welding even when $S \geq 0.5$ t, and if the welding conditions are optimized, it is possible to perform sound welding even when $S = 2.5$ t. When $S < 0.5$ t, welding by the welding method of the invention can be performed. However, when the gap is less than 0.5 t, in some cases, penetration is not achieved sufficiently in the welding process in DC-EN. That is, if $S < 0.5$ t, it is possible to perform sound welding in the usual welding process in DC-EP, and it is not necessary to select the MAG welding process in DC-EN.

Additionally, although the upper limit of the gap S is not specified, if the gap S exceeds 2.5 t, it becomes difficult to obtain the sound weld. Therefore, preferably, $S \leq 2.5$ t.

In the method for MAG welding in DC-EN of the invention, if welding is performed in two or more passes, since the penetration is shallow, welding defects due to cold lap and slag inclusion easily occur, and it is difficult to obtain a sound weld. Therefore, welding is performed in one pass in the method for MAG welding in DC-EN of the invention.

Although the flare joint, the T joint, and the lap joint are shown as examples in FIGS. 2A to 2C, when a joint of another shape is welded, welding is performed in one pass on the assumption that $S \geq 0.5$ t.

The preferable welding conditions in the method for MAG welding in DC-EN of the invention are as follows.

Shielding gas: a mixed gas of 0% to 90% by volume of Ar and 5% to 100% by volume of $CO_2$, or a mixed gas of 0% to 90% by volume of Ar and 1% to 10% by volume of $O_2$ Welding current: 80 to 250 A Welding voltage: 13 to 25 V Welding speed: 25 to 120 cm/minute Weld heat input: 2 to 10 kJ/cm Wire diameter: 0.9 to 1.6 mm Wire feeding speed: 1.2 to 10.0 m/min Next, a method for producing a steel wire for MAG welding in DC-EN of the invention will be described.

Molten steel having the composition described above is melted by a known method in a converter, electric furnace, or the like, and a steel raw material, such as a billet, is then produced by continuous casting or the like. The steel raw material is heated, and hot rolling is performed, optionally, followed by cold wire drawing, to form a bar steel. The conditions of hot rolling are not particularly limited as long as the bar steel having predetermined dimension and shape is obtained.

The bar steel is then subjected to the steps of annealing, acid pickling, Cu-plating, and wire drawing in that order, and a steel wire for MAG welding in DC-EN having a predetermined wire diameter is obtained. When the steel wire for MAG welding in DC-EN of the invention is produced, preferably, annealing is performed after a potassium salt solution is applied to the surface of the non-annealed steel wire. Examples of the potassium salt solution include an aqueous tripotassium citrate solution, an aqueous potassium carbonate solution, and an aqueous potassium hydroxide solution. With respect to the concentration of the aqueous potassium salt solution to be applied to the surface of the wire, the K content in the aqueous solution is preferably about 0.5% to about 3.0% by mass.

By annealing the steel wire in which the potassium salt solution has been applied to the surface, K is stably retained in the internal oxide layer produced during annealing. Although K reduces spattering, if the potassium salt is retained in (i.e., applied to) the surface of the steel wire, the spattering-reducing effect is decreased due to thermal instability. Therefore, preferably, annealing is performed after the potassium salt solution is preliminarily applied to the surface of the steel wire.

Annealing is performed to soften the steel wire and retain K in the internal oxide layer of the steel wire. Preferably, annealing is performed in the temperature range of about 650 to about 850° C. and in a nitrogen gas atmosphere containing steam. If the annealing temperature is less than about 650° C., internal oxidation proceeds slowly, and if the annealing temperature exceeds about 850° C., internal oxidation proceeds too fast to adjust the internal oxidation.

Figure 1B:
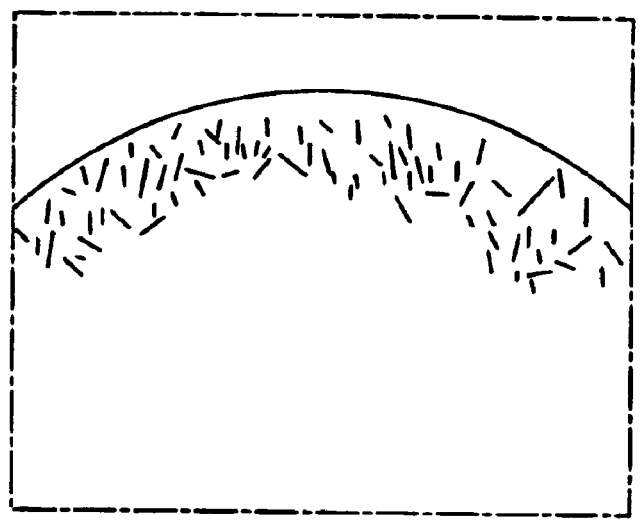
FIG. 1B is a schematic diagram showing an enlarged sectional view of the region A of FIG. 1A.

In view of forming the internal oxide layer, annealing is performed in an atmosphere with a dew point of about 0° C. or less and an oxygen concentration of about 200 ppm or less. By annealing the steel wire in which the potassium salt solution has been applied to the surface in such an atmosphere, oxidation starts from the surface of the steel wire, the surface region is internally oxidized as shown in FIGS. 1A and 1B, and K is ensured to be retained in the internal oxide layer. Preferably, the annealing conditions (i.e., temperature, time, atmosphere, etc.) are determined in conjunction with the wire diameter, the concentration of the potassium salt, and the amount of the potassium salt solution to be applied so that the K content in the steel wire is about 0.0003 to about 0.0030% by mass and the O content is about 0.0020 to about 0.0080% by mass.

The annealed bar steel is subjected to acid pickling, and the surface thereof is then Cu-plated. Preferably, the average thickness of the Cu-plating layer is about 0.5 μm or more.

In the welding process in DC-EN, in comparison with welding in DC-EP, the arc easily becomes unstable due to poor power feed. However, it is possible to prevent the arc from becoming unstable due to poor power feed by setting the average thickness of the Cu-plating layer at about 0.5 μm or more. By providing a thick Cu-plating layer in this way, abrasion of the power feeding tip can be reduced in addition to preventing an unstable arc.

However, toughness of the weld metal significantly decreases if the total of the Cu content in the steel wire for MAG welding in DC-EN and the Cu content in the Cu-plating layer exceeds about 3.0% by mass. Therefore, more preferably, the thickness of the Cu-plating layer is about 0.8 μm or more and the thickness of the Cu-plating layer is adjusted so that the total Cu content is about 3.0% by mass or less. Additionally, the thickness of the Cu-plating layer is determined by an electrolytic method, in which an aqueous solution including about 40% ammonium nitrate and about 0.5% ammonium hydroxide is used as the electrolytic solution and the electrical quantity during the electrolyzation is calculated. That is, copper in the Cu-plating layer is dissolved into the solution as bivalent ions (Cu→$Cu^{+2}$+2e). The atomicity N of dissolved Cu is C/2, where C is the electrical quantity (coulomb) at this stage. The molecularity is obtained by dividing the atomicity N by Avogadro's constant $6.02\times10^{23}$. The mass is obtained by multiplying the molecularity by the atomic weight 63.54 of Cu, and the volume of the Cu-plating layer is obtained by dividing the mass by the density D=8.96 of Cu. Furthermore, by dividing the volume by the surface area S ($cm^2$) of the wire which has been dissolved, the thickness of the Cu-plating layer is obtained. That is, the thickness of the Cu-plating layer (μm)=(N×63.54×10,000)/($6.02\times10^{23}$×8.96×S).

In the invention, the flatness of the steel wire for MAG welding in DC-EN is set at less than about 1.01 to stabilize the power feed during welding. It is possible to set the flatness of the steel wire for MAG welding in DC-EN by strictly controlling the die in the wire drawing process for the steel wire for MAG welding in DC-EN. As a result, the power feed during welding is stabilized and a decrease in spattering can be achieved. The flatness is the value calculated by the equation (3) below.

$$\text{Flatness}=A_M/A_R \qquad (3)$$

$A_M$: Actual surface area ($mm^2$) of steel wire itself for MAG welding in DC-EN $A_R$: Apparent surface area ($mm^2$) of steel wire itself for MAG welding in DC-EN Moreover, in the invention, in order to stabilize the power feed during welding, preferably, the amount of impurities adhering to the surface of the steel wire for MAG welding in DC-EN is set at about 0.01 g or less for 10 kg of the steel wire for MAG welding in DC-EN. Additionally, with respect to the lubricating oil which is applied to the surface of the steel wire to secure the feedability of the steel wire for MAG welding in DC-EN, the amount thereof is preferably in the range of about 0.35 to about 1.7 g for 10 kg of steel wire for MAG welding in DC-EN. The feedability of the steel wire for MAG welding in DC-EN is an important factor when robotic welding is performed.

EXAMPLE 1

A billet produced by continuous casting was hot-rolled to form a rod with a diameter of 5.5 to 7.0 mm, and cold wire drawing was then performed to form a bar steel with a diameter of 2.0 to 2.8 mm to obtain each of the wires shown in Tables 1 and 2 below. An aqueous tripotassium citrate solution in the quantity of 2 to 30% by mass was applied to the bar steel. The amount of application of the aqueous tripotassium citrate was 30 to 50 g for 1 kg of bar steel. Next, the bar steel was annealed in a nitrogen atmosphere containing 200 ppm by volume or less of $O_2$ and 0.1% by volume or less of $CO_2$ with a dew point of −2° C. or less. The annealing temperature was in the range of 750 to 950° C. At this stage, by controlling the diameter of the bar steel, the concentration of the potassium salt solution, the annealing temperature, and the annealing time, the O content and the K content in the bar steel were adjusted.

After annealing was performed, the bar steel was subjected to acid pickling, and the surface thereof was then Cu-plated. Next, cold wire drawing was performed, and a steel wire for MAG welding in DC-EN with a flatness of 1.003 to 1.005 and with a diameter of 1.2 mm was obtained. A lubricating oil was applied to the surface of the resultant steel wire for MAG welding in DC-EN. The amount of application of the lubricating oil was 0.35 to 1.7 g for 10 kg of steel wire for MAG welding in DC-EN. The compositions of the steel wires for MAG welding in DC-EN and the plating thicknesses thereof are shown in Tables 1 and 2. Additionally, five samples were taken from each wire and the values for the five samples obtained by the measuring methods described above were averaged to obtain the flatness of the wire and thickness of the Cu-plating layer.

Weld tests were conducted using the steel wires for MAG welding in DC-EN, and the amount of spattering, bead shape, and abrasiveness of the power feeding tip were evaluated as described below. The weld tests were conducted under the following conditions.

Composition of shielding gas: 80% by volume of Ar+20% by volume of $CO_2$

Shielding gas flow rate: 20 liter/min

Welding power source: Inverter power source

Polarity: Straight polarity (Electrode negative)

Welding current: 180 A

Welding voltage: 16 V

The evaluation results are shown in Tables 3 and 4.

(a) Amount of spattering: Butt welding was performed for a flare joint (thickness t=1.4 mm, gap S=0.5 t=0.7 mm) shown in FIG. 2A, and spatters with a diameter of 0.5 mm or more were collected by a collecting device formed of copper to measure the amount of spattering. The welding time was 1 minute. The amount of spattering was evaluated according to the following ratings.

A: Small (0.2 g or less for 100 g of weld deposition)

B: Slightly large (more than 0.2 g to 0.3 g)

F: Large (more than 0.3 g)

(b) Bead shape: Butt welding was performed for a flare joint (thickness t=1.4 mm, gap S=0.5 t=0.7 mm) shown in FIG. 2A, and the bead shape was visually observed. Evaluation was conducted according to the following ratings.

F: Failure (Burn through occurred.)

B: Slightly satisfactory (Undercuts or convex beads were formed.)

A: Good (No defects were observed.)

(c) Abrasiveness of power feeding tip: The outer periphery of a steel pipe with a diameter of 800 mm and a thickness of 25 mm was continuously welded while the steel pipe was being rotated on its axis. The welding time was 30 minutes. The inside diameters of the tip end were measured after welding was completed and using the maximum and minimum values thereof, the ellipticity of the inside diameter of the tip end was calculated. Evaluation was conducted according to the following ratings.

A: Good (ellipticity of 2% or less)

B: Slightly satisfactory (ellipticity of more than 2% to 5%)

F: Failure (ellipticity of more than 5%)

Additionally, the ellipticity is the value calculated by the equation (4) below.

$$\text{Ellipticity } (\%) = 100 \times \{(d_{max}/d_{min}) - 1\} \quad (4)$$

$d_{max}$: Maximum inside diameter of tip end $d_{min}$: Minimum inside diameter of tip end In Wire Nos. 1 to 40 of the invention, the amount of spattering with a diameter of 0.5 mm or more was 0.3 g or less for 100 g of weld deposition and, thus, the spatter-reducing effect was displayed. In particular, with respect to Wire Nos. 18 to 39, in which REM was added and the $D_2$ value was in the range of 1.2 to 2.1, the spatter-reducing effect was more remarkably displayed.

In the Comparative Examples, since the composition was out of the ranges of the invention, the amount of spattering with a diameter of 0.5 mm or more exceeded 0.6 g for 100 g of weld deposition and bead shape was inferior. With respect to the wires having a Cu-plating thickness of 0.5 μm or more, superior arc stability was shown and the abrasion of the tip was decreased. In contrast, with respect to Wire Nos. 3, 41, and 42 having a Cu-plating thickness of less than 0.5 μm, inferior arc stability was shown and the abrasion of the tip was increased.

EXAMPLE 2

Wire Nos. 22 and 30 shown in Table 2 were tested in MAG welding in DC-EN, in which a steel sheet with a thickness t of 1.2 mm in a lap joint shown in FIG. 2C was welded, and the gap weldability was evaluated. The welding conditions were as follows.

Shielding gas flow rate: 20 liter/min

Welding power source: Inverter power source

Polarity: Straight polarity Electrode negative)

Welding current: 150 A

Welding voltage: 16 V

Welding speed: 80 cm/min

The evaluation results are shown in Table 5.

(a) Penetration: Evaluations were conducted according to the following ratings.

A: Good (The maximum penetration in weld zone of the lower sheet shown in FIG. 2C was 40% or more of the steel thickness.)

B: Slightly satisfactory (The maximum penetration was 10% to less than 40%.)

F: Failure (The maximum penetration was less than 10%.)

(b) Appearance: Evaluations were conducted according to the following ratings.

F: Failure (Defects occurred due to burn through or either the upper sheet or the lower sheet shown in FIG. 2C was not penetrated.)

B: Slightly satisfactory (A reverse side bead was observed in the weld zone of the lower sheet.)

A: Good (No defects were observed in appearance.)

(c) Comprehensive evaluation

A: Good (Both the penetration evaluation and the appearance evaluation were good.)

F: Failure (Either the penetration evaluation or the appearance evaluation was failure.)

B: Slightly satisfactory (Other than the above)

A and B were considered to be acceptable.

In this example, it is confirmed that the acceptable weld zone can be obtained up to a ratio S/t of 2.5 (the gap S of 2.5 times thickness t).

In accordance with the invention, in MAG welding in DC-EN, superior arc stability is displayed, a large amount of weld deposition and shallow penetration can be achieved, and burn-through defects can be avoided. Hence, joints of thin steel sheets having a large gap can be welded stably. The invention also has other significant industrial advantages. For example, the amount of spattering can be decreased, superior power feed stability is exhibited, and the abrasion of the power feeding tip can be reduced.

TABLE 1

| Wire No. | | C | Si | Mn | P | S | Cr | Ni | Mo | Cu | B | K |
|---|---|---|---|---|---|---|---|---|---|---|---|---|
| Example | 1 | 0.065 | 0.80 | 1.42 | 0.002 | 0.004 | <0.01 | <0.01 | <0.01 | <0.01 | <0.0001 | <0.0001 |
| | 2 | 0.035 | 0.65 | 1.60 | 0.004 | 0.006 | 0.03 | 0.02 | 0.02 | 0.02 | <0.0001 | <0.0001 |

TABLE 1-continued

| | | C | Si | Mn | P | S | Cr | Ni | Mo | Cu | B | K |
|---|---|---|---|---|---|---|---|---|---|---|---|---|
| | 3 | 0.036 | 0.78 | 1.64 | 0.003 | 0.010 | 0.01 | 0.01 | 0.01 | 0.02 | <0.0001 | <0.0001 |
| | 4 | 0.045 | 0.85 | 1.61 | 0.003 | 0.015 | <0.01 | 0.01 | 0.01 | 0.01 | <0.0001 | <0.0001 |
| | 5 | 0.034 | 0.65 | 1.57 | 0.007 | 0.013 | 0.02 | 0.01 | <0.01 | 0.04 | 0.0004 | <0.0001 |
| | 6 | 0.034 | 0.58 | 1.52 | 0.004 | 0.005 | <0.01 | 0.01 | 0.02 | 0.02 | <0.0001 | <0.0001 |
| | 7 | 0.058 | 0.65 | 1.60 | 0.004 | 0.006 | <0.01 | 0.02 | 0.02 | 0.02 | 0.0005 | <0.0001 |
| | 8 | 0.054 | 0.72 | 1.85 | 0.004 | 0.003 | 0.02 | 0.01 | 0.02 | 0.02 | 0.0003 | <0.0001 |
| | 9 | 0.040 | 0.62 | 1.74 | 0.003 | 0.009 | 0.02 | 0.02 | 0.02 | 0.02 | <0.0001 | <0.0001 |
| | 10 | 0.035 | 0.64 | 1.73 | 0.003 | 0.012 | 0.02 | 0.02 | 0.02 | 0.02 | <0.0001 | <0.0001 |
| | 11 | 0.055 | 0.54 | 1.38 | 0.002 | 0.003 | <0.01 | 0.01 | 0.02 | 0.01 | 0.0001 | <0.0001 |
| | 12 | 0.035 | 0.50 | 1.45 | 0.005 | 0.002 | 0.02 | 0.01 | 0.02 | 0.01 | <0.0001 | <0.0001 |
| | 13 | 0.045 | 0.53 | 1.35 | 0.004 | 0.006 | 0.02 | 0.02 | 0.02 | 0.02 | <0.0001 | <0.0001 |
| | 14 | 0.041 | 0.65 | 1.20 | 0.003 | 0.009 | 0.02 | 0.02 | 0.03 | 0.03 | <0.0001 | <0.0001 |
| | 15 | 0.064 | 0.55 | 1.43 | 0.003 | 0.004 | 0.02 | 0.02 | 0.02 | 0.02 | 0.0002 | <0.0001 |
| | 16 | 0.082 | 0.90 | 1.40 | 0.003 | 0.025 | 0.03 | 0.02 | 0.02 | 0.05 | <0.0001 | <0.0001 |
| | 17 | 0.034 | 0.78 | 1.75 | 0.003 | 0.012 | 0.01 | 0.03 | 0.02 | 0.02 | <0.0001 | <0.0001 |
| | 18 | 0.046 | 0.68 | 1.85 | 0.002 | 0.008 | 0.02 | 0.02 | 0.02 | <0.01 | 0.0003 | <0.0001 |
| | 19 | 0.032 | 0.75 | 1.95 | 0.003 | 0.010 | 0.02 | 0.02 | 0.02 | 0.02 | 0.0002 | <0.0001 |
| | 20 | 0.044 | 0.77 | 1.65 | 0.004 | 0.016 | 0.15 | 0.02 | 0.25 | 0.02 | 0.0025 | <0.0001 |

| | Wire No. | Ca | N | O | Ti | Zr | Al | REM | $D_2$ | Plating thickness (μm) |
|---|---|---|---|---|---|---|---|---|---|---|
| Example | 1 | 0.0008 | 0.0036 | 0.0035 | 0.002 | 0.001 | 0.003 | 0.008 | 0.873 | 0.51 |
| | 2 | 0.0008 | 0.0036 | 0.0035 | 0.19 | 0.001 | 0.004 | 0.005 | 1.053 | 0.54 |
| | 3 | 0.0006 | 0.0042 | 0.0030 | 0.21 | 0.001 | 0.002 | 0.008 | 1.150 | 0.44 |
| | 4 | <0.0001 | 0.0032 | 0.0035 | 0.20 | 0.001 | 0.005 | 0.006 | 1.168 | 0.58 |
| | 5 | 0.0004 | 0.0025 | 0.0033 | 0.21 | 0.003 | 0.002 | 0.007 | 1.063 | 0.53 |
| | 6 | 0.0008 | 0.0033 | 0.0035 | 0.20 | 0.001 | 0.005 | 0.009 | 1.003 | 0.50 |
| | 7 | 0.0010 | 0.0041 | 0.0055 | 0.23 | 0.001 | 0.004 | 0.007 | 1.093 | 0.75 |
| | 8 | 0.0006 | 0.0035 | 0.0043 | 0.21 | 0.001 | 0.004 | 0.006 | 1.192 | 0.60 |
| | 9 | 0.0011 | 0.0040 | 0.0025 | 0.18 | 0.001 | 0.003 | 0.008 | 1.074 | 0.55 |
| | 10 | 0.0006 | 0.0025 | 0.0035 | 0.18 | 0.001 | 0.005 | 0.007 | 1.083 | 0.63 |
| | 11 | 0.0008 | 0.0040 | 0.0038 | 0.080 | 0.012 | 0.015 | 0.009 | 0.837 | 0.58 |
| | 12 | 0.0004 | 0.0025 | 0.0053 | 0.075 | 0.001 | 0.010 | 0.008 | 0.819 | 0.75 |
| | 13 | 0.0006 | 0.0030 | 0.0020 | 0.095 | 0.001 | 0.003 | 0.007 | 0.814 | 0.65 |
| | 14 | 0.0005 | 0.0025 | 0.0045 | 0.050 | 0.001 | 0.002 | 0.007 | 0.778 | 0.55 |
| | 15 | 0.0001 | 0.0035 | 0.0040 | 0.084 | 0.001 | 0.003 | 0.008 | 0.840 | 0.65 |
| | 16 | 0.0003 | 0.0030 | 0.0045 | 0.002 | 0.001 | 0.003 | 0.008 | 0.923 | 0.64 |
| | 17 | 0.0004 | 0.0035 | 0.0052 | 0.22 | 0.004 | 0.002 | 0.010 | 1.199 | 0.64 |
| | 18 | 0.0005 | 0.0031 | 0.0042 | 0.24 | 0.001 | 0.005 | 0.013 | 1.203 | 0.65 |
| | 19 | 0.0006 | 0.0044 | 0.0025 | 0.17 | 0.001 | 0.006 | 0.015 | 1.202 | 0.64 |
| | 20 | 0.0025 | 0.0038 | 0.0045 | 0.27 | 0.001 | 0.003 | 0.018 | 1.209 | 0.62 |

$D_2 = (Si)/2 + (Mn)/3 + ((Ti) + (Zr) + (Al))$

TABLE 2

| | Wire No. | C | Si | Mn | P | S | Cr | Ni | Mo | Cu | B | K |
|---|---|---|---|---|---|---|---|---|---|---|---|---|
| Example | 21 | 0.053 | 0.68 | 1.95 | 0.005 | 0.006 | 0.15 | 0.02 | 0.02 | 0.01 | 0.0002 | <0.0001 |
| | 22 | 0.041 | 0.78 | 1.86 | 0.001 | 0.012 | 0.03 | 0.02 | 0.35 | 0.01 | 0.0005 | <0.0001 |
| | 23 | 0.040 | 0.75 | 1.95 | 0.003 | 0.011 | 0.02 | 0.02 | 0.02 | 0.02 | 0.0002 | <0.0001 |
| | 24 | 0.035 | 0.70 | 1.85 | 0.005 | 0.014 | 0.02 | 0.02 | 0.03 | 0.02 | 0.0006 | <0.0001 |
| | 25 | 0.055 | 0.88 | 1.85 | 0.003 | 0.018 | 0.02 | 0.02 | 0.02 | 0.02 | 0.0001 | <0.0001 |
| | 26 | 0.054 | 0.90 | 1.75 | 0.006 | 0.012 | 0.02 | 0.02 | 0.02 | <0.01 | 0.0003 | <0.0001 |
| | 27 | 0.055 | 0.98 | 2.35 | 0.005 | 0.015 | 0.04 | 0.02 | 0.02 | 0.03 | 0.0006 | 0.0006 |
| | 28 | 0.035 | 1.10 | 2.25 | 0.004 | 0.016 | 0.02 | 0.02 | 0.03 | <0.01 | 0.0008 | 0.0015 |
| | 29 | 0.043 | 1.35 | 1.98 | 0.003 | 0.022 | 0.02 | 0.02 | 0.02 | 0.01 | 0.0004 | 0.0008 |
| | 30 | 0.055 | 1.25 | 2.35 | 0.006 | 0.015 | 0.02 | 0.02 | 0.02 | 0.02 | 0.0003 | 0.0018 |
| | 31 | 0.025 | 1.36 | 2.85 | 0.005 | 0.016 | 0.02 | 0.03 | 0.15 | 0.03 | 0.0006 | 0.0015 |
| | 32 | 0.052 | 1.65 | 2.85 | 0.005 | 0.015 | 0.10 | 0.02 | 0.15 | 0.03 | 0.0005 | 0.0012 |
| | 33 | 0.043 | 1.28 | 1.95 | 0.012 | 0.018 | 0.01 | 0.01 | 0.01 | <0.01 | 0.0001 | 0.0007 |
| | 34 | 0.085 | 1.18 | 2.12 | 0.006 | 0.018 | 0.01 | 0.01 | 0.02 | 0.01 | 0.0001 | 0.0005 |
| | 35 | 0.045 | 1.25 | 1.89 | 0.008 | 0.017 | 0.02 | 0.02 | 0.02 | <0.01 | 0.0015 | 0.0012 |
| | 36 | 0.052 | 1.36 | 2.05 | 0.004 | 0.015 | 0.50 | 2.00 | 0.30 | <0.01 | 0.0020 | 0.0003 |
| | 37 | 0.053 | 1.22 | 1.58 | 0.005 | 0.025 | 0.02 | 0.02 | 0.03 | 0.01 | 0.0006 | 0.0035 |
| | 38 | 0.056 | 1.25 | 2.00 | 0.002 | 0.023 | 0.02 | 0.02 | 0.02 | 0.02 | 0.0002 | 0.0006 |
| | 39 | 0.045 | 1.78 | 2.25 | 0.005 | 0.018 | 0.02 | 0.02 | 0.35 | 0.01 | 0.0024 | 0.0007 |
| | 40 | 0.040 | 1.55 | 2.75 | 0.005 | 0.018 | 0.02 | 0.02 | 0.35 | 0.01 | 0.0024 | 0.0007 |
| Comparative Example | 1 | 0.025 | 0.85 | 1.35 | 0.002 | 0.018 | 0.01 | 0.01 | 0.01 | 0.02 | <0.0001 | <0.0001 |
| | 2 | 0.040 | 0.65 | 1.70 | 0.003 | 0.009 | 0.02 | 0.02 | 0.02 | 0.03 | <0.0001 | <0.0001 |
| | 3 | 0.080 | 0.95 | 1.45 | 0.003 | 0.012 | 0.02 | 0.02 | 0.02 | 0.02 | <0.0001 | <0.0001 |

TABLE 2-continued

| Wire No. | | Ca | N | O | Ti | Zr | Al | REM | $D_2$ | Plating thickness ($\mu$m) |
|---|---|---|---|---|---|---|---|---|---|---|
| Example | 21 | 0.0018 | 0.0045 | 0.0038 | 0.19 | 0.001 | 0.015 | 0.017 | 1.196 | 0.78 |
| | 22 | 0.0027 | 0.0035 | 0.0042 | 0.20 | 0.001 | 0.003 | 0.019 | 1.214 | 0.65 |
| | 23 | 0.0035 | 0.0033 | 0.0038 | 0.18 | 0.001 | 0.007 | 0.017 | 1.213 | 0.64 |
| | 24 | 0.0050 | 0.0025 | 0.0033 | 0.22 | 0.001 | 0.015 | 0.015 | 1.203 | 0.54 |
| | 25 | 0.0035 | 0.0040 | 0.0050 | 0.15 | 0.001 | 0.005 | 0.018 | 1.213 | 0.66 |
| | 26 | 0.0035 | 0.0045 | 0.0038 | 0.17 | 0.001 | 0.004 | 0.019 | 1.208 | 0.50 |
| | 27 | 0.0032 | 0.0032 | 0.0065 | 0.22 | 0.001 | 0.005 | 0.021 | 1.499 | 0.80 |
| | 28 | 0.0018 | 0.0025 | 0.0068 | 0.21 | 0.001 | 0.003 | 0.023 | 1.514 | 0.85 |
| | 29 | 0.0026 | 0.0048 | 0.0081 | 0.21 | 0.001 | 0.006 | 0.028 | 1.552 | 0.93 |
| | 30 | 0.0030 | 0.0025 | 0.0095 | 0.18 | 0.001 | 0.005 | 0.030 | 1.594 | 0.99 |
| | 31 | 0.0016 | 0.0052 | 0.0105 | 0.25 | 0.001 | 0.012 | 0.023 | 1.893 | 0.87 |
| | 32 | 0.0035 | 0.0059 | 0.0165 | 0.30 | 0.001 | 0.015 | 0.022 | 2.091 | 1.01 |
| | 33 | 0.0032 | 0.0038 | 0.0065 | 0.23 | 0.001 | 0.008 | 0.024 | 1.529 | 1.11 |
| | 34 | 0.0036 | 0.0038 | 0.0075 | 0.21 | 0.001 | 0.004 | 0.025 | 1.512 | 0.98 |
| | 35 | 0.0033 | 0.0054 | 0.0102 | 0.23 | 0.001 | 0.015 | 0.026 | 1.501 | 0.94 |
| | 36 | 0.0025 | 0.0030 | 0.0085 | 0.20 | 0.001 | 0.035 | 0.026 | 1.599 | 0.91 |
| | 37 | 0.0028 | 0.0042 | 0.0195 | 0.28 | 0.001 | 0.015 | 0.015 | 1.433 | 0.88 |
| | 38 | 0.0032 | 0.0015 | 0.0095 | 0.29 | 0.001 | 0.006 | 0.018 | 1.589 | 0.90 |
| | 39 | 0.0040 | 0.0036 | 0.0120 | 0.27 | 0.001 | 0.021 | 0.040 | 1.932 | 0.85 |
| | 40 | 0.0040 | 0.0036 | 0.0120 | 0.29 | 0.02 | 0.150 | 0.040 | 2.156 | 0.88 |
| Comparative Example | 1 | 0.0002 | 0.0045 | 0.0068 | 0.04 | 0.001 | 0.003 | 0.003 | 0.919 | 0.44 |
| | 2 | 0.0004 | 0.0035 | 0.0035 | 0.12 | 0.001 | 0.004 | 0.004 | 1.017 | 0.32 |
| | 3 | 0.0001 | 0.0035 | 0.0042 | 0.08 | 0.001 | 0.003 | 0.002 | 1.042 | 0.41 |

$D_2 = (Si)/2 + (Mn)/3 + ((Ti) + (Zr) + (Al))$

TABLE 3

| | | Amount of spattering | | Bead shape | Tip abrasiveness | |
|---|---|---|---|---|---|---|
| | | g/min | Evaluation | | Ellipticity (%) | Evaluation |
| Example | 1 | 0.29 | B | B | 4.6 | B |
| | 2 | 0.28 | B | B | 4.4 | B |
| | 3 | 0.29 | B | B | 7.5 | F |
| | 4 | 0.22 | B | B | 4.3 | B |
| | 5 | 0.25 | B | B | 4.2 | B |
| | 6 | 0.21 | B | B | 4.6 | B |
| | 7 | 0.24 | B | B | 3.3 | B |
| | 8 | 0.27 | B | B | 4.1 | B |
| | 9 | 0.23 | B | B | 4.6 | B |
| | 10 | 0.24 | B | B | 3.8 | B |
| | 11 | 0.21 | B | B | 4.2 | B |
| | 12 | 0.22 | B | B | 2.3 | B |
| | 13 | 0.24 | B | B | 3.2 | B |
| | 14 | 0.25 | B | B | 4.0 | B |
| | 15 | 0.23 | B | B | 3.6 | B |
| | 16 | 0.24 | B | B | 3.7 | B |
| | 17 | 0.20 | A | A | 3.7 | B |
| | 18 | 0.18 | A | A | 3.3 | B |
| | 19 | 0.16 | A | A | 3.4 | B |
| | 20 | 0.15 | A | A | 3.6 | B |

Amount of spattering: Particle size of 0.5 mm or more

TABLE 4

| | | Amount of spattering | | Bead shape | Tip abrasiveness | |
|---|---|---|---|---|---|---|
| | | g/min | Evaluation | | Ellipticity (%) | Evaluation |
| | 21 | 0.16 | A | A | 2.4 | B |
| | 22 | 0.14 | A | A | 3.5 | B |
| | 23 | 0.15 | A | A | 3.4 | B |
| | 24 | 0.16 | A | A | 4.1 | B |
| | 25 | 0.14 | A | A | 3.6 | B |
| | 26 | 0.13 | A | A | 4.8 | B |
| | 27 | 0.12 | A | A | 1.9 | B |
| | 28 | 0.11 | A | A | 1.6 | B |
| | 29 | 0.10 | A | A | 1.5 | B |
| | 30 | 0.09 | A | A | 1.4 | A |
| | 31 | 0.12 | A | A | 1.7 | A |
| | 32 | 0.11 | A | A | 1.3 | A |
| | 33 | 0.10 | A | A | 1.3 | A |
| | 34 | 0.10 | A | A | 1.4 | A |
| | 35 | 0.10 | A | A | 1.5 | A |
| | 36 | 0.09 | A | A | 1.5 | A |
| | 37 | 0.12 | A | A | 1.6 | A |
| | 38 | 0.13 | A | A | 1.5 | A |
| | 39 | 0.09 | A | A | 1.6 | A |
| | 40 | 0.28 | B | A | 1.4 | A |
| Comparative example | 1 | 0.65 | F | F | 5.7 | F |
| | 2 | 0.85 | F | F | 8.4 | F |
| | 3 | 0.75 | F | F | 6.7 | F |

Amount of spattering: Particle size of 0.5 mm or more

TABLE 5

| Item | Wire No. | Shielding gas | Thickness t(mm) | Gap S(mm) | S/t | Penetration g/min | Appearance | Comprehensive evaluation |
|---|---|---|---|---|---|---|---|---|
| Example | 22 | Ar-20% CO$_2$ | 1.2 | 0.2 | 0.17 | B | A | B |
| | 22 | | 1.2 | 0.4 | 0.33 | B | A | B |
| | 22 | | 1.2 | 0.6 | 0.50 | A | A | A |
| | 22 | | 1.2 | 0.8 | 0.67 | A | A | A |
| | 22 | | 1.2 | 1.2 | 1.00 | A | A | A |
| | 22 | | 1.2 | 1.8 | 1.50 | A | A | A |
| | 22 | | 1.2 | 2.4 | 2.00 | A | B | A |
| | 22 | | 1.2 | 3.0 | 2.50 | A | B | A |
| | 22 | | 1.2 | 3.6 | 3.00 | A | F | F |
| | 30 | 100% CO$_2$ | 1.2 | 0.2 | 0.17 | B | A | B |
| | 30 | | 1.2 | 0.4 | 0.33 | A | A | A |
| | 30 | | 1.2 | 0.6 | 0.50 | A | A | A |
| | 30 | | 1.2 | 0.8 | 0.67 | A | A | A |
| | 30 | | 1.2 | 1.2 | 1.00 | A | A | A |
| | 30 | | 1.2 | 1.8 | 1.50 | A | B | B |
| | 31 | | 1.2 | 2.4 | 2.00 | A | B | B |
| | 32 | | 1.2 | 3.0 | 2.50 | A | B | B |
| | 33 | | 1.2 | 3.6 | 3.00 | A | F | F |

What is claimed is:

1. A steel wire for MAG welding in DC-electrode negative comprising:
   a core having
      about 0.20% by mass or less of C;
      about 0.25% to about 2.5% by mass of Si;
      about 0.45% to about 3.5% by mass of Mn;
      about 0.005% to about 0.040% by mass of rare-earth elements;
      about 0.05% by mass or less of P,
      about 0.05% by mass or less of S;
      the balance being Fe and incidental impurities; and
   an outermost Cu layer coating said steel wire and having a thickness of at least 0.5 μm.

2. The steel wire according to claim 1, wherein a $D_1$ value in accordance with the following equation (1) is in the range of about 1.2 to about 2.1;

$$D_1 = ((Si)/2) + ((Mn)/3) \quad (1)$$

wherein (Si) is the Si content (% by mass) and (Mn) is the Mn content (% by mass).

3. The steel wire according to claim 1, further comprising at least one of about 0.30% by mass or less of Ti, about 0.30% by mass or less of Zr, and about 0.50% by mass or less of Al.

4. The steel wire according to claim 3, wherein a $D_2$ value in accordance with the following equation (2) is in the range of about 1.2 to about 2.1:

$$D_2 = ((Si)/2) + ((Mn)/3) + ((Ti) + (Zr) + (Al)) \quad (2)$$

wherein (Si) is the Si content (% by mass), (Mn) is the Mn content (% by mass), (Ti) is the Ti content (% by mass), (Zr) is the Zr content (% by mass), and (Al) is the Al content (% by mass).

5. The steel wire according to claim 1, further comprising about 3.00% by mass or less of Cr.

6. The steel wire according to claim 1, further comprising about 0.0001 to about 0.0150% by mass of K.

7. The steel wire according to claim 1, further comprising about 0.0050% by mass or less of Ca.

8. The steel wire according to claim 1, further comprising about 3.0% or less of Ni.

9. The steel wire according to claim 1, further comprising about 1.5% or less of Mo.

10. The steel wire according to claim 1, further comprising about 3.0% or less of Cu.

11. The steel wire according to claim 1, further comprising about 0.010% or less of B.

12. The steel wire according to claim 1, further comprising about 0.55% or less of Nb.

13. The steel wire according to claim 1, further comprising about 0.55% or less of V.

* * * * *